United States Patent [19]

Cooper

[11] 4,064,588
[45] Dec. 27, 1977

[54] TILE GROUT-CLEANING TOOL

[76] Inventor: Jack B. Cooper, 4312 W. Main St., Skokie, Ill. 60076

[21] Appl. No.: 681,704

[22] Filed: Apr. 29, 1976

[51] Int. Cl.² .......................................... A47L 13/08
[52] U.S. Cl. .............................. 15/236 R; 15/235.3; 145/108 R
[58] Field of Search ............... 15/104 S, 236 R, 235.3, 15/235.6; 17/19, 31, 66; 30/166 R, 169, 329, 338, 339, 355; 145/31 R, 31 AD, 31 C, 108 R

[56] References Cited

U.S. PATENT DOCUMENTS

| 148,136 | 3/1874 | Parmele | 145/31 C |
|---|---|---|---|
| 421,995 | 2/1890 | Reibnitz | 15/236 UX |
| 1,438,645 | 12/1922 | Hill | 145/31 C |
| 1,872,939 | 8/1932 | Haddican | 15/236 R |
| 1,898,747 | 2/1933 | Schacht | 30/169 |
| 2,287,231 | 6/1942 | Cathcard et al. | 15/104 S |
| 2,783,798 | 3/1957 | Weinberger | 145/31 C |

FOREIGN PATENT DOCUMENTS

| 219,262 | 1/1962 | Austria | 145/31 AD |
|---|---|---|---|
| 543,877 | 6/1922 | France | 30/169 |
| 1,051,074 | 9/1953 | France | 15/235.6 |
| 1,753 of | 1909 | United Kingdom | 15/245 |

Primary Examiner—Daniel Blum
Attorney, Agent, or Firm—Silverman & Cass, Ltd.

[57] ABSTRACT

A tool for manually cleaning the grout between tiles affixed to a wall. The tool has a substantially pear-shaped handle with a large and a small end. A blade is secured in a slot bifurcating the small end having teeth along one edge and protruding from the handle. The teeth are finely and selectively spaced and dimensioned and aligned in a straight line to remove small grout particles when the handle is manually reciprocated. The blade has perforations which are aligned with holes extending through the smaller end of the handle. Screws extend through the holes and perforations from one side of the handle to the other to clamp the blade securely in the slot.

1 Claim, 4 Drawing Figures

U.S. Patent    Dec. 27, 1977    4,064,588
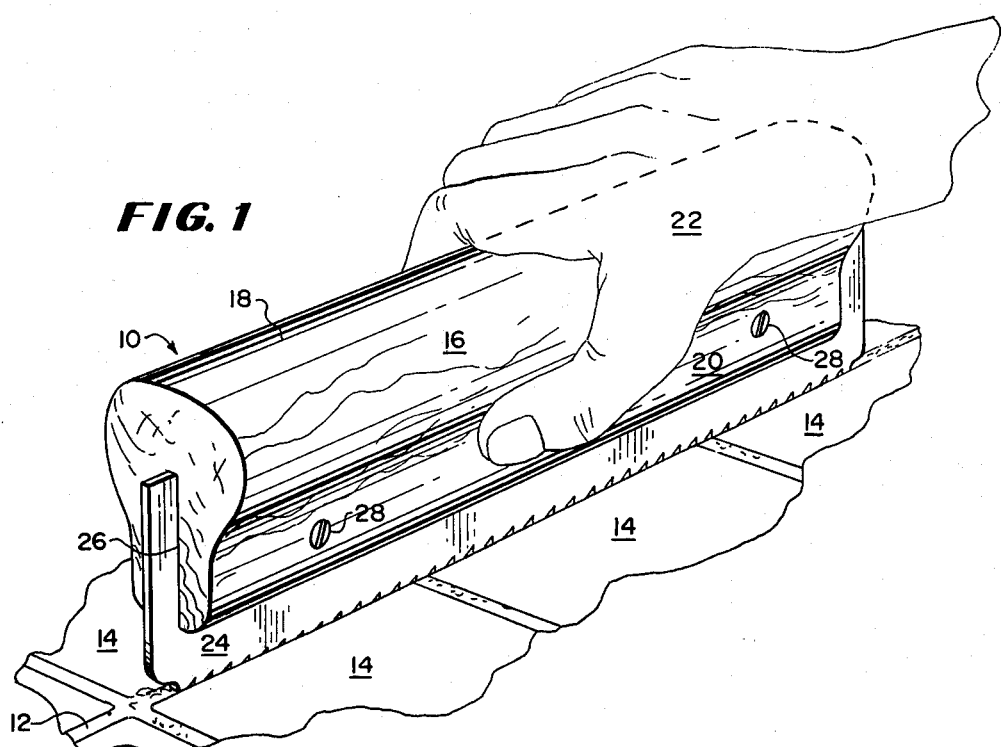
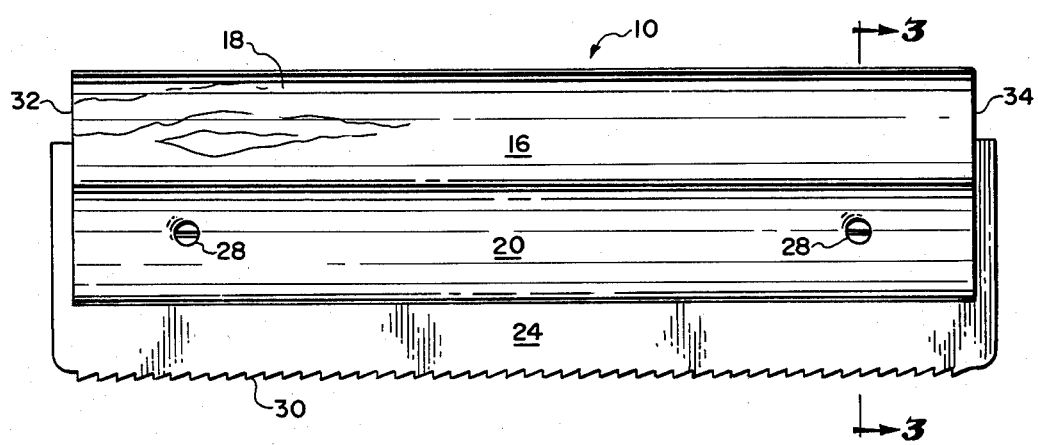
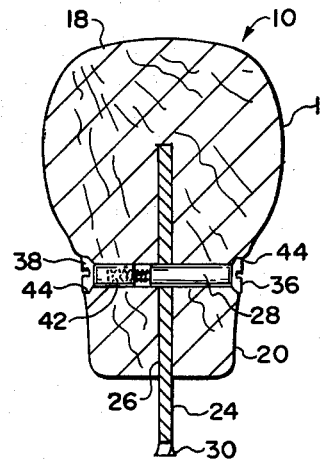
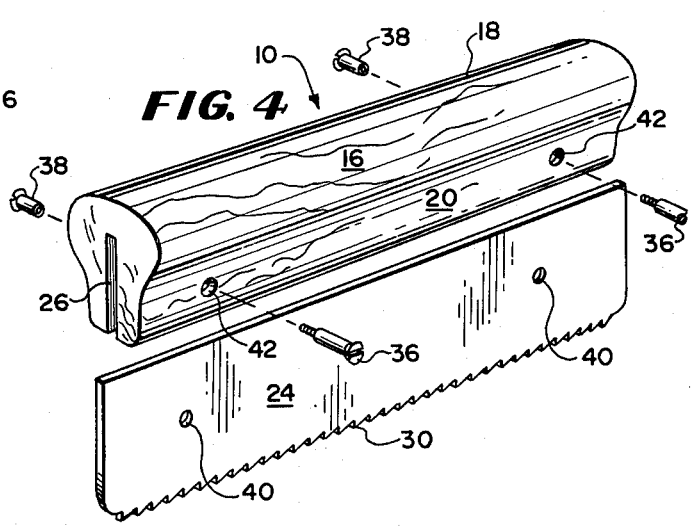

TILE GROUT-CLEANING TOOL

BACKGROUND OF THE INVENTION

The invention relates to a tool for cleaning grout and more particularly to a tool which is adapted to be manually reciprocated along the lines of grout between tiles affixed to a wall to remove grout particles of fine mesh size to clean the grout without affecting the function of the grout.

The lines of grout between bath wall tiles and floor tiles become dirty after sustained use. Therefore, the need has developed for a tool for engaging the lines of grout to be cleaned speedily and effectively without adversely affecting the function and appearance of the grout.

SUMMARY OF THE INVENTION

The present invention provides a hand tool for cleaning the lines of grout between tiles affixed to a wall or floor surface. The hand tool comprises a generally pear-shaped handle having a large end and a small end with a blade secured in a slot extending through and bifurcating the small end of the handle. The blade is a rigid member extending from both side ends of the handle and having a toothed edge protruding from and along the axis of the slot in a straight line. The teeth are very fine and selectively spaced and dimensioned to permit the blade and teeth to be engaged against the line of grout between the tiles and manipulated to remove fine mesh size grout particles thereby to clean the grout without impairing the function or appearance of the grout between the tiles. The blade has two perforations which are aligned with holes transversely extending through the small end and removable fastener means are engaged through the holes and perforations to clamp the blade rigidly in the handle. The rigid mounting of the blade helps to prevent inadvertent sliding of the blade away from the grout line and to scratch adjacent tiles.

BRIEF DESCRIPTION OF THE DRAWING

FIG. 1 is a perspective view of the tool of the invention shown engaging a line of grout between tiles affixed to a wall surface;

FIG. 2 is a side plan view of the tool;

FIG. 3 is a section view taken through an end of the tool along line 3—3 of FIG. 2; and FIG. 4 is an exploded perspective view of the tool.

DESCRIPTION OF THE PREFERRED EMBODIMENT

As indicated above, the invention is concerned with cleaning the grout between tiles affixed to a wall surface. The tool is adapted to be manually reciprocated to quickly and easily clean the grout without adversely affecting the function and appearance of the grout between the tiles.

Referring now to FIG. 1, the tool of the invention is designated generally by reference character 10 and is shown engaged in a line of grout 12. The tool is engaged with the line of grout 12 between tiles 14 affixed to a wall surface.

The tool 10 has a generally pear-shaped handle 16 with a large end 18 and a small end 20. The pear-shaped handle 16 may be easily and securely held in one hand 22 of the operator for manual reciprocation thereof to accomplish grout cleaning.

The handle 16 has a blade 24 clamped in a slot 26 which bifurcates the small end 20. The slot 26 extends approximately two-thirds of the depth of the handle. The blade 24 is removably clamped in the handle 16 by screws 28. The blade may be clamped in the slot 26 by any convenient securing method such as rivets or nuts and bolts. Approximately three-fourths of the depth of the blade is positioned within the slot to provide a rigid mounting.

The protruding, working edge of the blade 24 is provided with a set of teeth 30 which are very finely spaced and aligned in a straight line to remove dirt and grout particles of a very fine mesh size for cleaning the grout without adversely affecting the function and/or appearance of the grout. As seen in FIG. 1, the tool 10 can be grasped with one hand and manually reciprocated in the lines of grout between the tiles 14.

FIG. 2 illustrates a side view of the tool. The set of teeth 30 extend the full length of the exposed edge of the blade 24. The blade may extend slightly beyond the side ends 32 and 34 of the handle 16 within the scope of the invention. The blade is rigidly clamped between the bifurcated sides of the small end 20 to prevent the blade from collapsing or slipping out of the lines of grout and defacing the tiles 14.

Referring now to FIGS. 3 and 4, the screws 28 have a male end 36 and a female end 38. The male and female ends of the screws are engaged through perforations 40 in the blade 24 and are disposed in holes 42 in the handle 16. The holes 42 are chamfered at each end 44 to provide a seat for the ends of the screws and a bearing surface to allow the screws to be tightened to rigidly clamp the blade therebetween.

The handle 16 may be made of wood or plastic or other suitable materials. The blade 24 has a gauge selected to allow it to be placed between the tiles 14 to engage the line of grout 12.

As can be most clearly seen in FIG. 3, the pear-shaped handle 16 provides the large end 18 and the small end 20 to allow the handle to be firmly grasped for manual reciprocation.

Modifications and variations of the present invention are possible in light of the above teachings. It is, therefore, to be understood that within the scope of the appended claims, the invention may be practiced otherwise than as specifically described.

What it is desired to secure by Letters Patent of the United States is:

1. A hand tool for cleaning substantially straight lines of grout between rectangular tiles affixed to a wall surface, said tool comprising:

an elongate handle of generally constant dimensioned pear-shaped cross section having a larger dimension end and a smaller dimension opposite end adapted to be grasped by said larger dimension end for manually reciprocating said tool in the lengthwise direction, said opposite end having a longitudinal slot extending at least halfway through said handle and extending the entire length thereof and opening to the marginal edge of said opposite end to bifurcate the same, a pair of holes extending transversely through said smaller dimension opposite end, spaced apart one toward each side end of said handle;

blade means having fine teeth along one edge thereof for reciprocating along the length of said edge in said lines of grout to clean said grout, said blade means is a thin rigid substantially rectangular member secured in said slot with said teeth protruding from said slot along substantially the entire length of said slot, approximately three-fourths of the depth of said member positioned in said slot, said edge having said teeth is substantially straight and said member protrudes from each side end of said handle, said teeth being selectively spaced and dimensioned and having a gauge selected to allow said teeth and member to be engaged along the length thereof with said lines of grout between said tiles to remove grout particles of fine mesh size for cleaning the lines of grout when said tool is reciprocated without impairing the function of the grout between said tiles, and said member including a pair of perforations spaced apart such that each one aligns with one of said holes when said blade means is inserted in said slot; and securing means extending through each of said holes and said aligned perforations through said handle in said smaller dimension opposite end removably and rigidly clamping said blade means between said bifurcated opposite end.

* * * * *